April 18, 1944.  J. D. GADDIE  2,346,742
VEGETABLE WASHER
Filed Dec. 6, 1941  2 Sheets-Sheet 1

John D. Gaddie,
INVENTOR.

BY
Victor J. Evans & Co.
ATTORNEYS

April 18, 1944.   J. D. GADDIE   2,346,742
VEGETABLE WASHER
Filed Dec. 6, 1941   2 Sheets-Sheet 2

John D. Gaddie,
INVENTOR.

BY
*Victor J. Evans & Co.*
ATTORNEYS

Patented Apr. 18, 1944

2,346,742

UNITED STATES PATENT OFFICE 2,346,742

VEGETABLE WASHER

John D. Gaddie, Union City, Tenn.

Application December 6, 1941, Serial No. 421,998

2 Claims. (Cl. 146—194)

This invention relates to vegetable washers and has for an object to provide a vegetable washer in which a two compartment tank is provided with spiral skeleton agitators in each compartment and with cards at the ends of the agitator for respectively discharging the washed vegetables from one compartment into the other and from the final compartment onto an endless carrier, the spiral agitators serving to first thoroughly remove sand from the vegetables and then thoroughly rinse the vegetables, especially spinach, in minimum time and in one continuous operation.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a perspective view of the two compartment tank.

Figure 1:
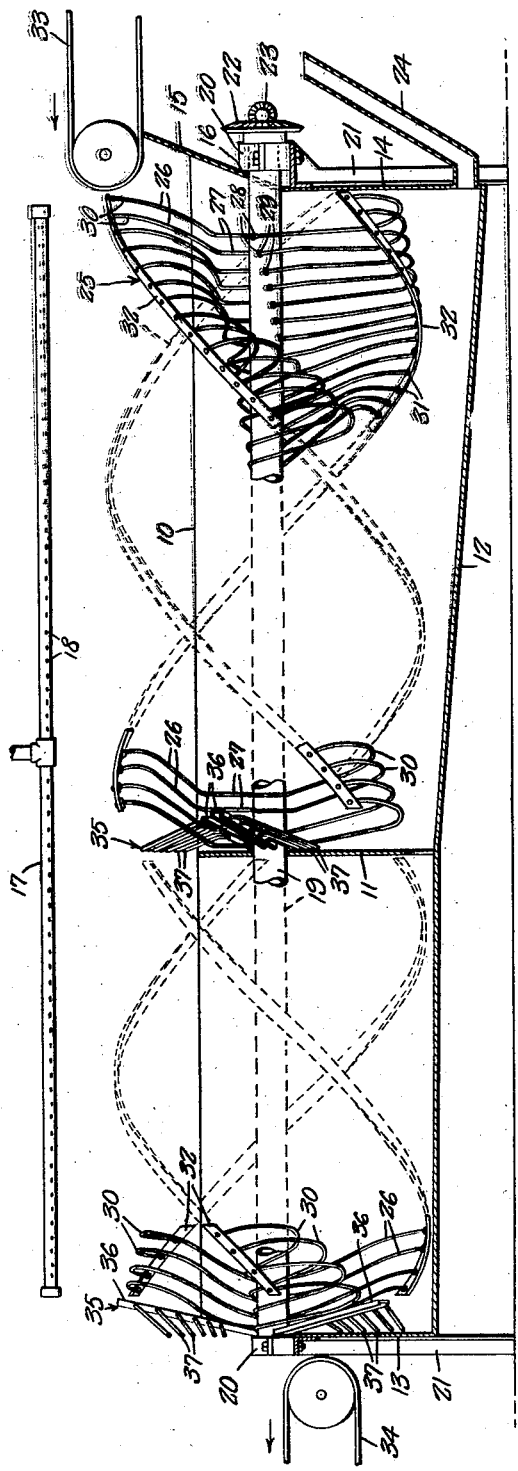
Figure 1 is a longitudinal sectional view of a vegetable washer constructed in accordance with the invention.

Referring now to the drawings in which like characters of reference designate similar parts in the various views, 10 designates a tank provided with a partition 11 disposed about two-thirds of the distance from the intake end to the discharge end of the tank, the bottom wall 12 being rounded and tapering from the intake end to the partition, and from the partition to the outlet being substantially cylindrical. An end closure wall 13 is disposed at the outlet end of the tank and is less in height than the height of the tank. An end closure 14 is disposed at the intake end of the tank and is slightly less in height than the side walls for the tank and formed integral with the end closure 14 is an inclined chute 15 which is provided at the bottom with an overflow opening 16 to regulate the height of water in the tank.

A water supply pipe 17 is disposed above the tank and extends longitudinally of the tank. The pipe is provided with perforations 18 at the bottom to supply water to the tank through the length of the tank.

A shaft 19 is journaled at the ends in bearing 20 carried by standards 21 which support the tank above the floor or other support. The shaft is engaged through the partition 11. That end of the shaft at the intake end of the tank is equipped exteriorly of the tank with a bevel gear 22 which meshes with a driving bevel gear 23 and the tank is equipped below this end of the shaft with an outlet pipe 24.

The shaft is equipped with spiral agitators 25, preferably three in number, extending from the intake end of the tank to the outlet end of the tank and making about one and one half turns longitudinally of the shaft 19. Each agitator is of skeleton construction and is formed of a plurality of teeth 26 formed of rods each having a substantially straight portion 27, see Figure 3, at the inner end provided with an eye 28 which is secured to a shaft 19 by a screw bolt 29, see Figure 2. From the straight portion the rod is curved as shown at 30 in Figure 3 and is terminally equipped with an eye 31 which is secured to a spiral bar 32. The structure is such that one of the agitators will carry the vegetables under the water while another is bringing the vegetables out of the water and the third spiral will be passing overhead, each revolution of the agitators carrying the vegetables forward about eight to ten inches toward the discharge end of the tank.

An endless carrier 33 is disposed at the intake end of the tank above the chute 15 for delivering vegetables to the tank, the vegetables sliding down the chute into the agitators, see Figure 1.

An endless carrier 34 is disposed at the delivery end of the tank to receive the washed and rinsed vegetables from the tank.

By referring again to Figure 1 it will be seen that cards 35 are disposed on the shaft in advance of the partition 11 and in advance of the discharge end wall 13. The purpose of these cards is to respectively deliver vegetables washed free of sand and adhering particles from the compartment at the intake end of the tank to the compartment at the discharge end of the tank, and to deliver rinsed vegetables from the compartment at the discharge end of the tank to the discharge endless carrier 34.

Figure 2:
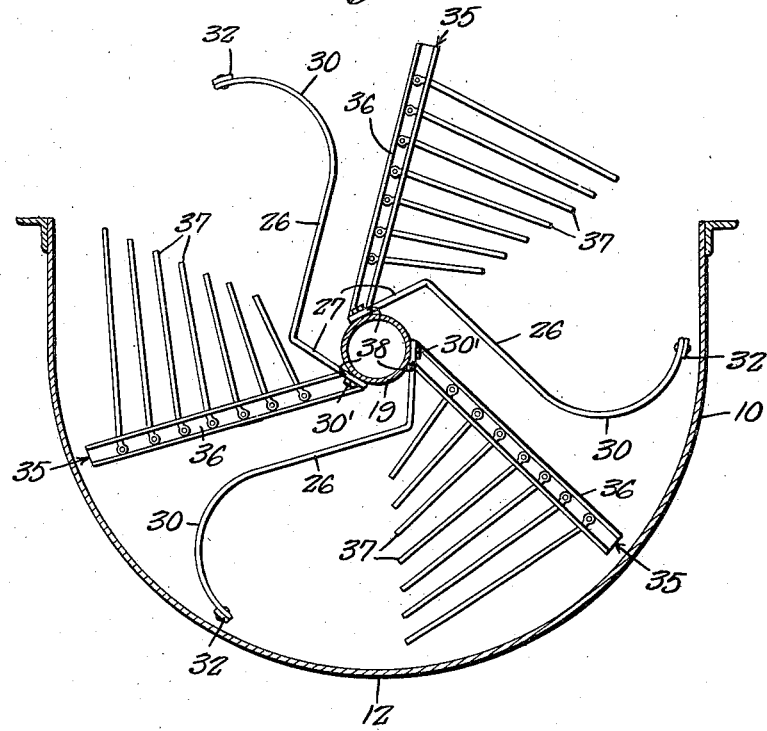
Figure 2 is a cross sectional view of the vegetable washer showing one set of cards and one set of spiral teeth of the adjacent agitator.
Figure 3:
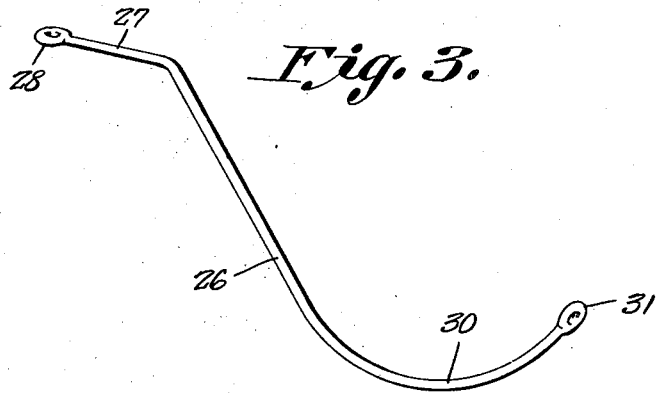
Figure 3 is a perspective view of one of the spiral teeth of the agitator.

Each card comprises a bar 36, see Figure 2, to which a plurality of straight teeth 37 are secured, the bar being provided with an offset 38 at the inner end which is bolted to the shaft 19 as shown at 30. The teeth 37 are formed of rods and the teeth are arranged to converge slightly toward their free ends, and are directed at such an angle relatively to the bar 36 as to pick up the vegetables and discharge the same in a direction from the intake end of the tank toward the discharge end of the tank for the purpose aforesaid, during rotation of the shaft 19.

Since the operation of the parts has been described as the description of the parts progressed it is thought the invention will be fully understood without further explanation.

What is claimed is:

1. In vegetable washing apparatus, a tank, a longitudinally extending shaft rotatably journaled on the tank, means fixed to the shaft for conducting vegetables from end to end of the tank, a plurality of arms fixed to and extending in a generally radial direction from the shaft and having an inclination toward the shaft axis, and a plurality of straight rods fixed to each of the said arms at longitudinally spaced intervals, the said rods being of successively increasing length from the inner toward the outer end of the arm and projecting therefrom in a direction substantially perpendicular to the arm and transversely of the shaft axis whereby to eject vegetables from the conducting means.

2. In vegetable washing apparatus, an elongated tank, a shaft rotatably journaled in the tank in longitudinally extending position, spiral carriers fixed to the shaft and extending longitudinally thereof so as to move vegetables from the supply end to the discharge end of the tank and to agitate the same during such movement, and means at the discharge end of the tank operative to eject the vegetables from the conveyors, the same means including a plurality of arms rigidly secured to the shaft and projecting therefrom in a generally radial direction, and a plurality of straight rods having one end fixed to each arm at longitudinally spaced intervals along the arm and being of successively increasing length, the said rods being disposed to converge outwardly of the arm and extending mainly at right angles to the arm and transversely of the shaft axis with the free ends directed outward of the discharge end of the tank with relation to the inner fixed ends thereof.

JOHN D. GADDIE.